United States Patent [19]

La Rocca

[11] Patent Number: 5,532,451

[45] Date of Patent: Jul. 2, 1996

[54] COMBINED CUTTING AND WELDING PROCESS FOR MANUFACTURING STRUCTURAL PRODUCTS, AND APPARATUS IMPLEMENTING SUCH A PROCESS

[75] Inventor: Aldo V. La Rocca, Moncalieri, Italy

[73] Assignee: Lara Consultants, S.r.l., Moncalieri, Italy

[21] Appl. No.: 295,769

[22] PCT Filed: Mar. 4, 1993

[86] PCT No.: PCT/IT93/00018

§ 371 Date: Nov. 3, 1994

§ 102(e) Date: Nov. 3, 1994

[87] PCT Pub. No.: WO93/17805

PCT Pub. Date: Sep. 16, 1994

[30] Foreign Application Priority Data

Mar. 4, 1992 [IT] Italy .................................. TO92A0178

[51] Int. Cl.[6] ............................ B23K 26/08; B23K 78/02
[52] U.S. Cl. ..................... 219/121.64; 219/121.63; 219/121.67; 219/121.76; 228/170; 228/212
[58] Field of Search ..................... 219/101, 104, 219/105, 121.63, 121.64, 121.67, 121.76, 121.82, 121.85, 121.68, 121.69; 228/44.3, 170, 182, 184, 212

[56] References Cited

U.S. PATENT DOCUMENTS

| | | | |
|---|---|---|---|
| 3,556,508 | 1/1971 | Varga | 269/155 |
| 3,755,647 | 8/1973 | Pierart | 219/126 |
| 4,227,065 | 10/1980 | Paradi et al. | 219/121.64 |
| 4,229,641 | 10/1980 | Ihara | 219/125.1 |
| 4,487,356 | 12/1984 | Krieger et al. | 228/46 |
| 4,993,619 | 2/1991 | Kresse, Jr. et al. | 228/135 |
| 5,318,216 | 6/1994 | Berniolles | 228/171 |
| 5,399,834 | 3/1995 | Guth | 219/121.63 |

FOREIGN PATENT DOCUMENTS 2352716 12/1977 France.
1570655 7/1980 United Kingdom.

OTHER PUBLICATIONS

Patent Abstracts of Japan vol. 11, No. 90, Mar. 20, 1987.

*Primary Examiner*—Mark H. Paschall
*Assistant Examiner*—J. Pelham
*Attorney, Agent, or Firm*—Michael N. Meller

[57] ABSTRACT

A process and apparatus for manufacturing structural steel metal products in which a strip of sheet metal is fed along a plane and cut by a laser into a number of sheets with each sheet secured to a respective supporting surface of a rotary work holder and welded by an additional laser to the previous sheet along a common edge.

18 Claims, 6 Drawing Sheets

COMBINED CUTTING AND WELDING PROCESS FOR MANUFACTURING STRUCTURAL PRODUCTS, AND APPARATUS IMPLEMENTING SUCH A PROCESS

TECHNICAL FIELD

The present invention relates to a combined cutting and welding process for manufacturing structural sheet metal products, preferably using laser beams; an apparatus implementing such a process; and the products manufactured thereby.

BACKGROUND ART

Structural products with polygonal sections (e.g. rectangular box sections) or such as to present a high moment of inertia (section irons) for achieving a high degree of flexural and torsional rigidity, are commonly used in widely differing fields of industry.

Depending on the type and thickness of the material and the required shape, such products are generally manufactured using standard permanent deformation (pressing, bending) or extrusion techniques.

A drawback common to all the above techniques is the high cost of the equipment involved, which not only affects the cost of the finished product, but also results in a substantially total absence of versatility J at production level. No firm, in fact, would normally contemplate replacing production machinery before it is entirely written off.

In the case of permanent deformation (pressing or bending), in particular, the loads required for achieving marked local deformation of the material (e.g. for deep drawing, forming sharp edges, etc.) invariably result in springback of the material, so that the pressed or bent part springs back to a different shape when the load is removed.

The dimensional inaccuracy resulting from this is especially evident when the part is connected and welded, e.g. spot welded, to another, which generally requires that the two parts be maintained contacting under load. When the load is removed after welding, however, the parts nevertheless tend to relax, thus permanently stressing the weld spots throughout the working life of the structure. Particularly in the case of structures subjected to repeated, impulsive stress (e.g. vehicles), such stress is responsible for sudden, at least macroscopic, failure of the weld spots, which spreads "domino" fashion from one spot to the next along the weld line, at times with catastrophic consequences to the structure.

The above problem, which is partly due to traces of machining oil in the molten material during welding, and which, on vaporizing, result in metallurgical irregularities and microcracks, has to some extent been solved by performing an additional pickling stage prior to welding. Besides only partially solving the problem, however, pickling adds even further expense to the already high direct and indirect cost of conventional methods.

In addition to the oil effect described above, weld spot failure is also caused by electrolytic erosion resulting from an accumulation, in turn aggravated by the capillary effect, of damp, water or dirt in the weld spot area.

Extrusion processes also present numerous drawbacks, foremost of which are high operating and energy costs; invariably poor finish; and serious limitations in terms of the material, size and shape of the finished part.

DISCLOSURE OF INVENTION

It is therefore an object of the present invention to provide a process for manufacturing structural sheet metal products, designed to overcome the above drawbacks typically associated with conventional techniques.

According to the present invention, there is provided a process for manufacturing structural sheet metal products, characterized by the fact that it comprises at least the following stages, consisting in:

a) feeding a continuous strip of sheet metal on to a supporting surface of a work holder defining at least two supporting surfaces forming, at least ideally, a common edge and successively positioned coincident with the plane along which said sheet metal strip is fed;

b) clamping said strip on to said supporting surface;

c) cutting a first sheet off said strip;

d) resetting said work holder so as to position a further supporting surface coincident with said plane;

e) feeding said strip on to said further supporting surface of said work holder;

f) clamping said strip on to said further supporting surface;

g) cutting a further sheet off said strip;

h) welding said sheets substantially along said common edge of said supporting surfaces.

It is a further object of the present invention to provide an apparatus implementing the above process.

According to the present invention, there is provided an apparatus for manufacturing structural sheet metal products; characterized by the fact that it comprises:

means for feeding a sheet metal strip along a given plane;

at least one work holder having at least two supporting surfaces forming, at least ideally, a common edge;

means for so positioning said work holder as to successively position said supporting surfaces coincident with said plane;

means for clamping said strip on to each said supporting surface;

means for cutting said strip into sheets fitted to respective said supporting surfaces of said work holder;

means for welding said sheets substantially along a common edge.

The present invention also relates to a structural sheet metal product formed using the above process and comprising a number of metal sheets cut off a continuous sheet metal strip by at least a first laser beam, and welded along a common edge by at least a second laser beam.

BRIEF DESCRIPTION OF DRAWINGS.

A number of preferred non-limiting embodiments of the present invention will be described by way of example with reference to the accompanying drawings, in which.

BEST MODE FOR CARRYING OUT THE INVENTION

Figure 1:
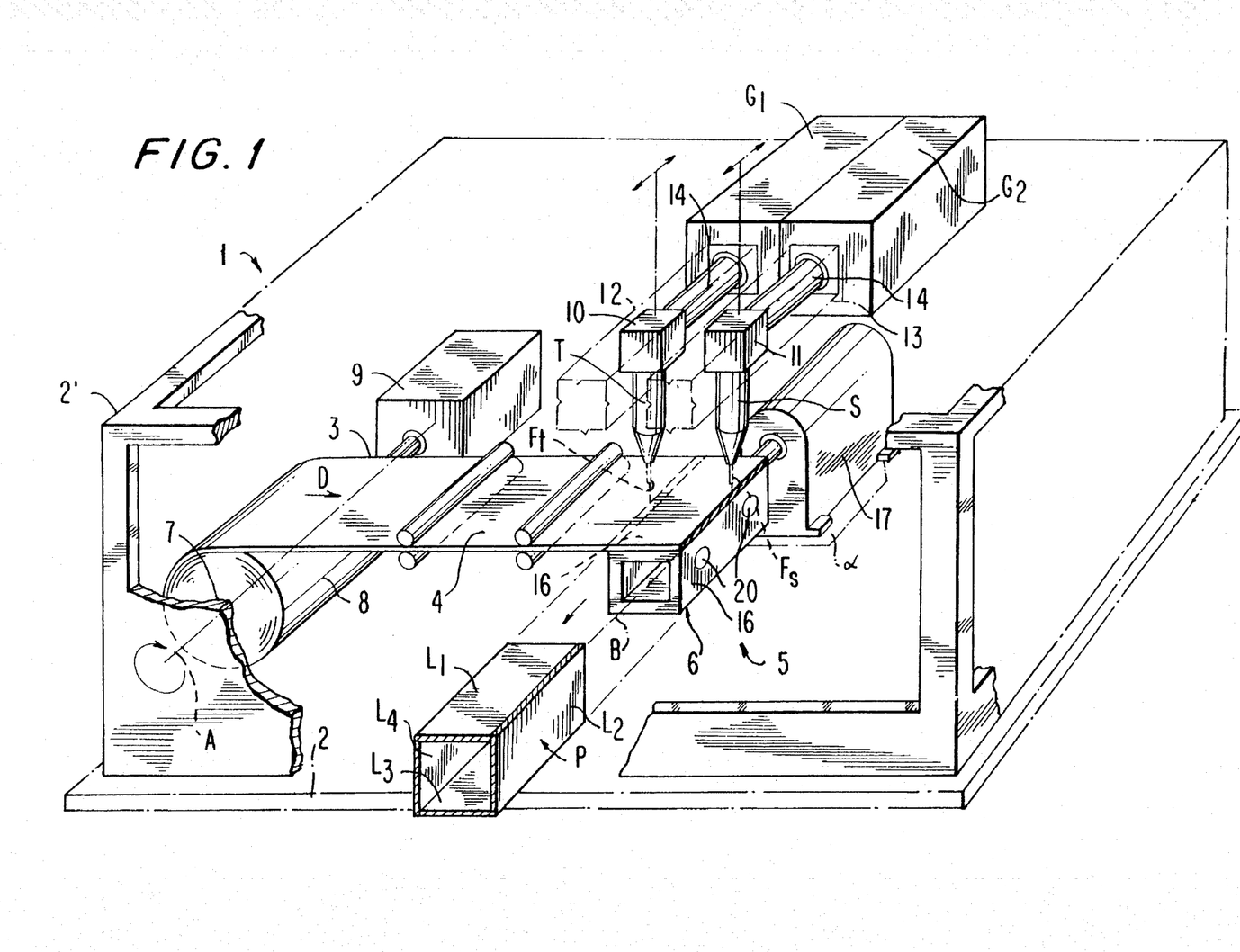
FIG. 1 shows a schematic partial view in perspective of an apparatus for manufacturing structural sheet metal products according to the teachings of the present invention.

Number 1 in FIG. 1 indicates an apparatus for manufacturing structural sheet metal products, in particular, hollow square-section products P.

Apparatus 1 substantially comprises a base 2 supporting a device 3 for feeding a strip of sheet metal 4; and a work station 5 in turn comprising a work holder 6 on to which strip 4 is fed by device 3, and two focusing heads T, S for focusing respective laser beams Ft, Fs.

More specifically, feed device 3 comprises a reel 7 rotating about a horizontal axis A and fitted with a roll 8 of strip metal 4; and known drive means 9 angularly connected to reel 7 for rotating it and so reeling off strip 4. The reeled-off portion of strip 4, supported on known guide means, defines a horizontal operating plane α.

Focusing heads T, S are arranged vertically and supported over plane α on respective carriages 10, 11 running along horizontal slideways 12, 13 integral with the superstructure 2' of apparatus 1. Slideways 12, 13 are parallel to each other and to axis A of reel 7, so that heads T, S move perpendicular to the traveling direction of strip 4 indicated by arrow D.

Carriages 10, 11 are driven along respective slideways 12, 13 by any known type of drive means (not shown).

Focusing heads T, S are connected optically, e.g. by means of telescopic conduits 14 parallel to slideways 12, 13, to respective laser beam sources G1, G2; and house respective mirrors (not shown) for reflecting the beams from respective sources G1, G2 perpendicular to plane α.

Laser head T provides for cutting, so that means must be provided for directing shielding gas, e.g. oxygen, on to the work area when cutting ferrous sheet metal. Said means, which do not form part of the present invention and are therefore not shown or described in detail, may be of any known type, and are preferably as described in Italian Patent Application n.TO91A000949, filed on 6 Dec., 1991, and entitled: "Method of supplying laser cutting gas, and cutting apparatus implementing such a method", the content of which is incorporated herein purely by way of reference as required.

Laser head S, on the other hand, provides for welding, so that means must be provided for directing shielding gas, e.g. helium, on to the weld area. Said means, which do not form part of the present invention and are therefore not shown or described in detail, may be of any known type, and are preferably as described in Italian Patent Application n.TO91A000933, filed on 29 Nov., 1991, and entitled: "Method and device for supplying laser shielding gas", the content of which is incorporated herein purely by way of reference as required.

Work holder 6 is a square-based parallelepiped element substantially matching the inner cavity of the finished product, and is positioned with its horizontal axis B parallel to plane α and perpendicular to traveling direction D of strip 4, and with top surface 16 lying in plane α. Work holder 6 is connected angularly to a drive device 17 by which it is rotated in 90° steps so as to successively position surfaces 16 coincident with plane α.

Work holder 6 and laser heads S and T are so arranged mutually that head S moves in the plane of lateral surface 16 furthest from reel 7, while head T moves in a plane parallel to that of lateral surface 16 facing reel 7, and separated from it, in the direction of reel 7, by a distance substantially equal to the thickness of the sheet (FIG. 2).

Surfaces 16 of work holder 6 are conveniently provided with releasable means 20, e.g. electromagnets or suction cups, for clamping the sheet.

FIGS. 2 and 3 show successive stages in the manufacture of product P.

In the first stage (FIGS. 2a, 3a), strip 4 is fed on to top surface 16 of work holder 6 and arrested flush with the edge furthest from reel 7, conveniently by means of a movable mechanical stop device 21, which, at this stage, is positioned contacting lateral surface 16 furthest from reel 7. When arrested, strip 4 is secured by clamping means 20 to top surface 16 of work holder 6, at which point, stop 21 is removed.

Figure 3A:
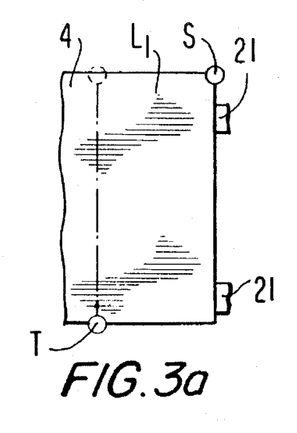
FIGS. 3a–3e show a schematic top plan view of the FIG. 2 stages.
Figure 3B:
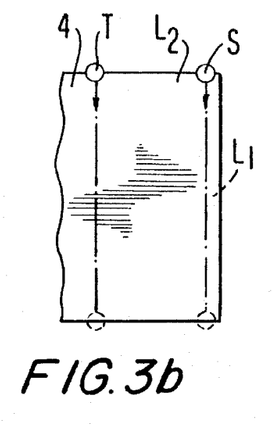
Figure 3C:
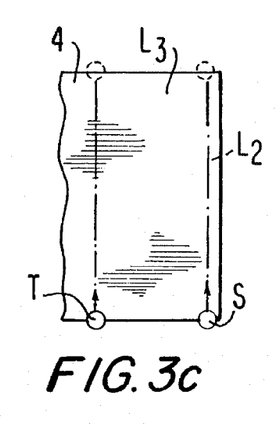
Figure 3D:
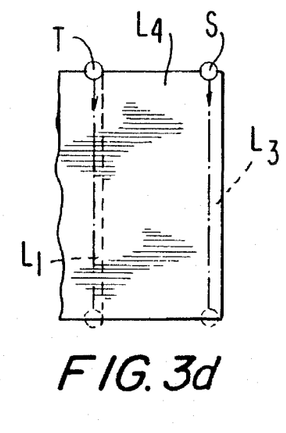
Figure 3E:
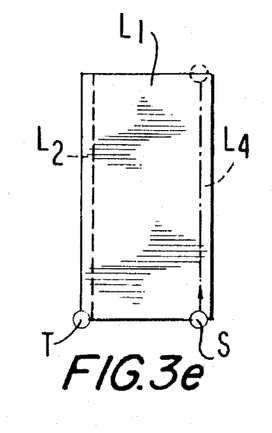
Figure 4A:
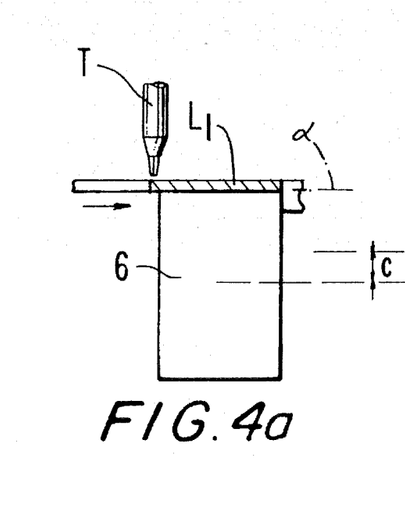
FIGS. 4a–4e show schematic cross sections of successive stages in the manufacture of a rectangular-section product using the process according to the present invention.
Figure 4B:
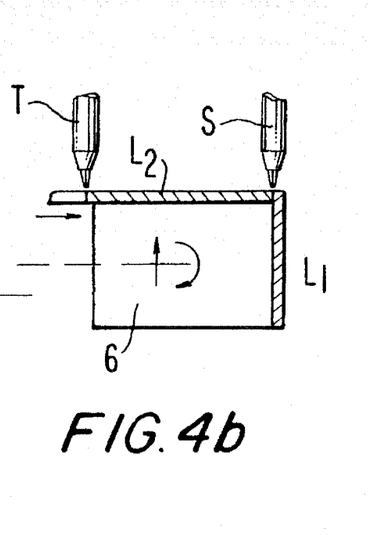
Figure 4C:
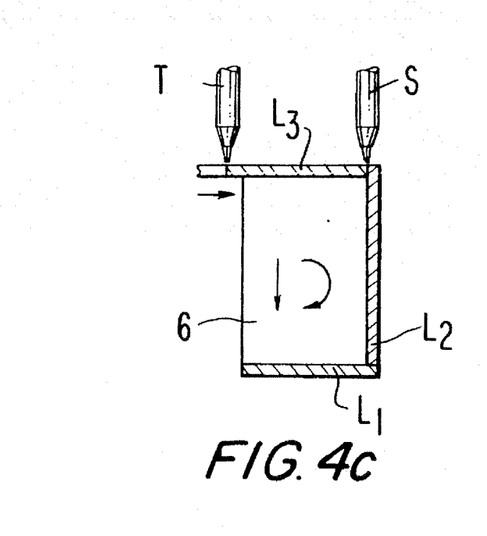
Figure 4D:
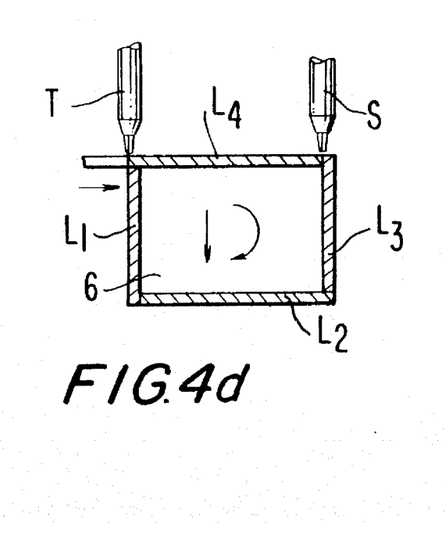
Figure 4E:
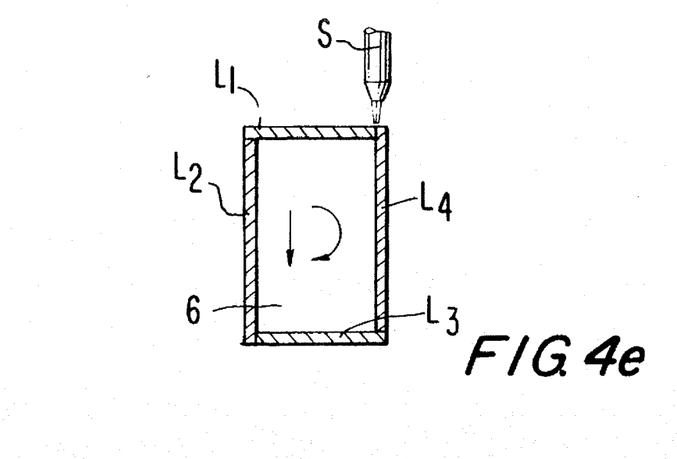

At this stage, heads T and S are positioned on opposite sides of strip 4 (FIG. 3a). Head S remains idle, while T moves across strip 4, as shown by the dotted line in FIG. 3a, to cut off a first sheet L1, which is secured integral with top surface 16 via clamping means 20, and presents a projecting lateral edge 22 equal in width to the thickness of the sheet. At the end of this stage, both heads T and S are positioned on the same side of strip 4.

In the second stage (FIGS. 2b, 3b), work holder 6 is rotated 90° in the traveling direction of strip 4, and a further portion of strip 4 is fed and clamped by means 20 on to the next top surface of the work holder. In this case, strip 4 is arrested by edge 22 of sheet L1, and heads T and S move simultaneously in the same direction, so as to respectively cut a further sheet L2 off strip 4 and simultaneously weld the contacting edges of sheets L2 and L1.

The third and fourth stages (FIGS. 2c, 3c and 2d, 3d) are identical to the second stage, and consist in rotating work holder 6; feeding a further portion of strip 4 into contact with the projecting edge of the previous sheet; and simultaneously operating heads T and S, obviously in the opposite direction to the previous stage, for simultaneously cutting a further sheet off strip 4 and welding it to the previous sheet.

The fifth and last stage (FIGS. 2e, 3e) consists in rotating work holder 6, each surface 16 of which presents a respective sheet L1, :;:, L4, and performing a final weld between sheets L1 and L4. At the end of the fifth stage, in which the strip feed device and cutting head T are obviously idle, clamping means 20 securing the sheets to the surfaces of work holder 6 are deactivated, and the finished product P withdrawn axially (FIG. 1).

At this point, all the station 5 components are again in the start position ready for the next cycle.

FIG. 4 shows a variation of the above process, for manufacturing rectangular-section products.

The process as a whole is identical to that of FIG. 2, except that, in this case, the apparatus must also take into account the different widths of the sheets constituting the larger and smaller faces of the finished product.

More specifically, in addition to rotating, work holder 6, which in this case presents a rectangular section, is also designed to move vertically for successively positioning the top surface coincident with plane α. In particular, work holder 6 moves upwards for positioning a larger surface coincident with plane α, and downwards by the same amount for switching to a smaller surface, the travel distance being equal to c=(a-b)/2, where "a" and "b" are the widths of the larger and smaller surfaces respectively.

The distance between laser heads S and T must also be adjusted between one stage and the next, to take into account the different widths of the sheets for cutting.

Figure 5:
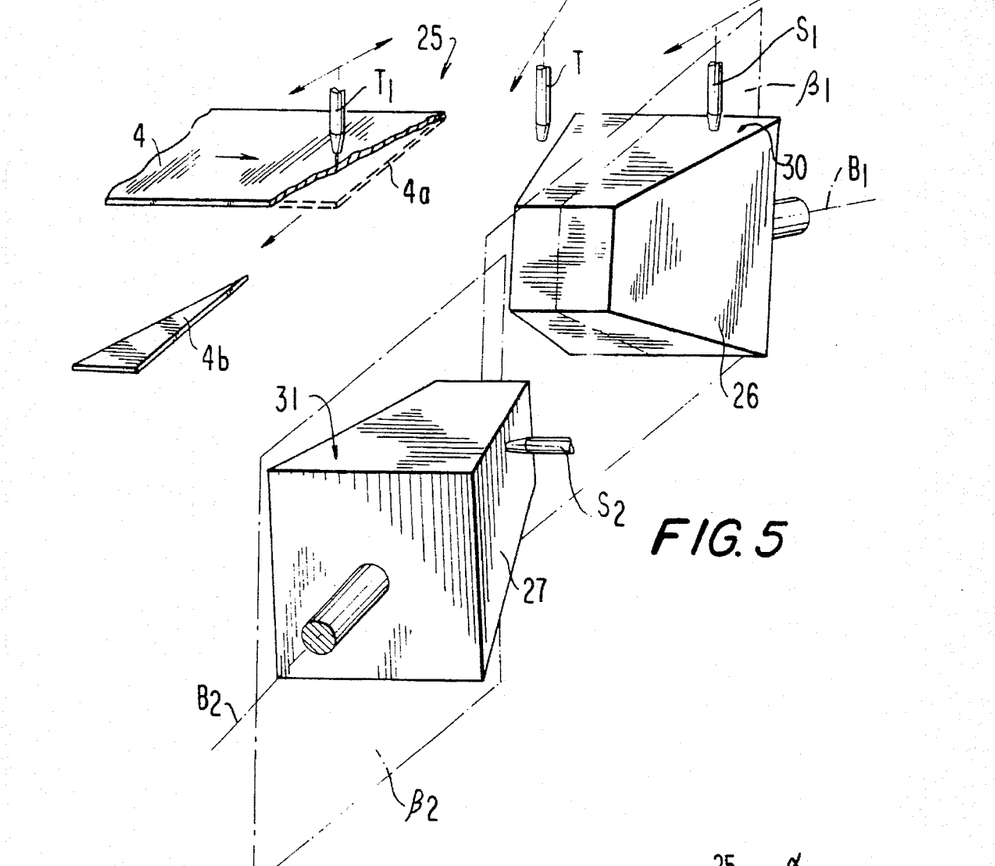
FIG. 5 shows a schematic view in perspective of a variation at one station for manufacturing truncated-pyramid-shaped products.
Figure 6:
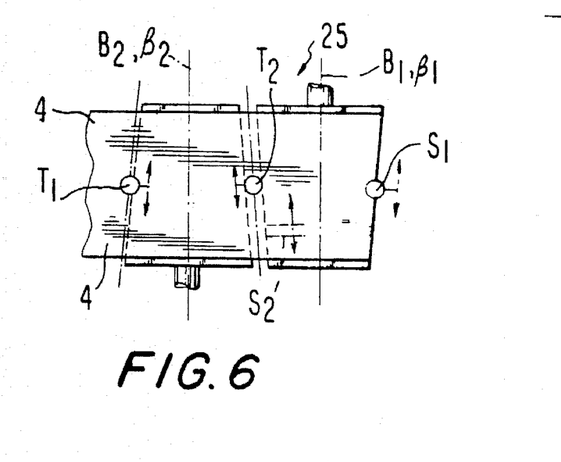
FIG. 6 shows a schematic top plan view of the FIG. 5 station.
Figure 7:
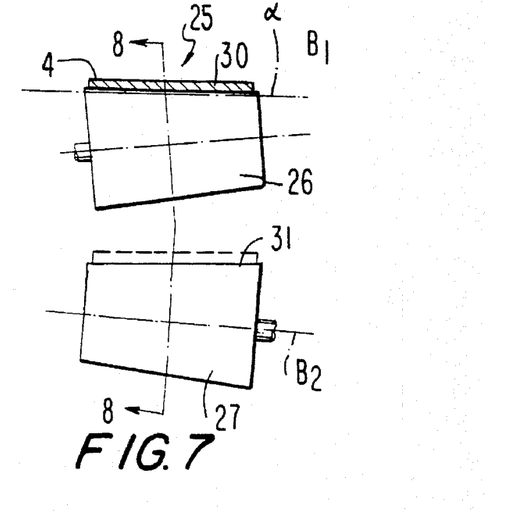
FIG. 7 shows a schematic side view of the FIG. 5 station.

FIGS. 5 to 7 show an alternative station, indicated as a whole by 25, for continuously manufacturing truncated-pyramid-shaped products with no scrap (except at the start and end of the metal strip).

Station 25 comprises two side by side truncated-pyramid-shaped work holders 26, 27 rotating about respective axes B1, B2, tapering in opposite directions, and offset vertically in relation to each other. More specifically, axes B1, B2 lie in respective planes β1, β2 perpendicular to plane α and so spaced that, when viewed from above (FIG. 6), the distance between the respective top surfaces of work holders 26, 27 is equal to twice the thickness of the sheet.

Moreover, axes B1, B2 in planes β1, β2 are so inclined that work holder 26 furthest from reel 7 presents a horizontal top surface 30 coincident with plane α, while work holder 27 closest to reel 7 presents a horizontal top surface 31 beneath plane α and work holder 26 (FIG. 7).

Station 25 comprises two laser cutting heads T1, T2, and two laser welding heads S1, S2. Heads T1, T2 and S1 provide for directing respective beams perpendicular to plane α; head T1 moves along a vertical plane containing the top edge of work holder 27 facing reel 7; head T2 moves along a vertical plane parallel and equidistant in relation to the closest top edges of work holders 26, 27; head S1 moves along a vertical plane containing the top edge of work holder 26 furthest from reel 7; and head S2 moves along a horizontal plane containing the top surface of work holder 27, so as to direct a beam perpendicular to the top edge of work holder 27 furthest from reel 7.

The process commences with a preliminary stage in which strip 4, having a leading edge 4a perpendicular to the lateral edges, is fed at least within the operating range of laser head T1.

Head T1 is then activated for cutting off a triangular portion 4b, which is scrapped in any known manner (FIG. 5), so that strip 4 now presents a leading edge parallel to the top edge of work holder 26 furthest from reel 7, thus enabling commencement of the continuous process.

Figure 8A:
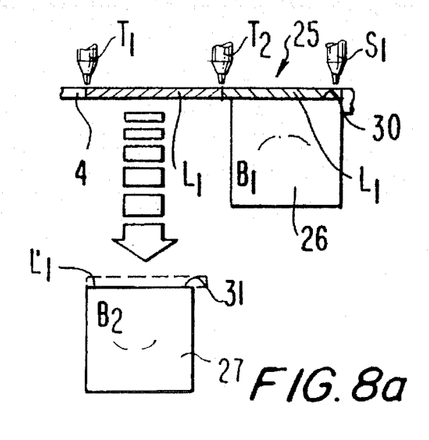
FIGS. 8a–8e show a schematic section along line VIII—VIII in FIG. 7 of successive stages in the manufacture of square-section, truncated-pyramid-shaped products.

In the first stage (FIGS. 6, 8a), strip 4 is fed forward until the leading edge is positioned flush with said top edge of work holder 26; and heads T1 and T2 are activated simultaneously for cutting off a sheet L1, which is secured to the top surface of work holder 26, and a sheet L'1, which is fed vertically, by known means not shown, on to the top surface of work holder 27.

Figure 8B:
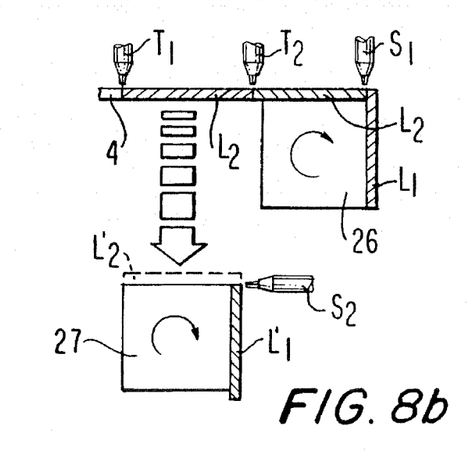
Figure 8C:
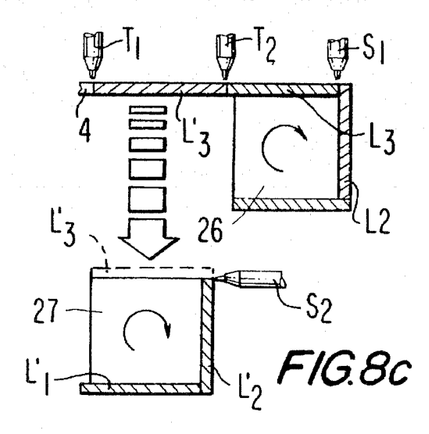
Figure 8D:
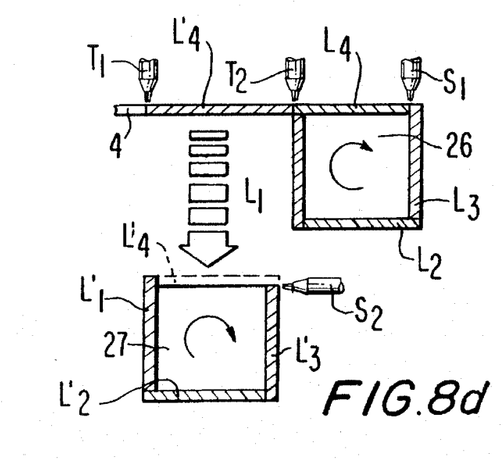

As shown in FIGS. 8b, 8c and 8d, the following stages in the process consist in:

rotating work holders 26, 27 through 90°;

feeding strip 4 into contact with the projecting edge of the previously cut sheet Li−1 (where i=2, ... ,4);

operating heads T1 and T2 to cut off sheets Li and L'i, which are respectively secured to the top surface of work holder 26 and fed vertically on to the top surface of work holder 27;

operating heads S1 and S2 for respectively welding sheets Li and Li−1, and sheets L'i and L'i−1.

Figure 8E:
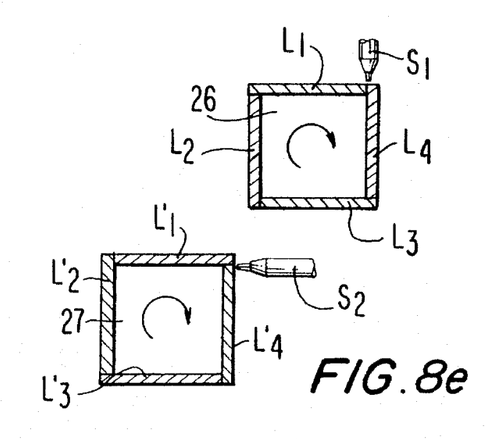

In the last stage (FIG. 8e), which involves no feeding or cutting of strip 4, the work holders are rotated for welding sheets L1 and L4 and sheets L'1 and L'4, thus completing the parts, which are removed in known manner.

The advantages of the process according to the present invention will be clear from the foregoing description.

In particular, it involves no permanent deformation, thus eliminating stress and, more especially, springback of the material. Laser cutting and welding, in fact, when performed properly, induce entirely negligible stress and distortion of the material, and provide for producing highly accurate parts with practically no internal stress. What is more, the strength of laser welded joints is even superior to that of the starting material, so that the mechanical characteristics of the finished parts are not only equivalent to but even superior to those of similar parts manufactured using traditional techniques.

Laser welding also provides for troublefree welding of materials, such as certain types of stainless steel, that are notoriously difficult to weld using traditional methods.

Finally, as compared with traditional methods, the process according to the present invention provides for reducing tooling costs while at the same time enabling far greater versatility in terms of production.

To those skilled in the art it will be clear that changes may be made to the processes and relative equipment described and illustrated herein without, however, departing from the scope of the present invention.

For example, the work holders may be designed and appropriately operated for manufacturing prismatic polygonal-section parts of any type.

Figure 2A:
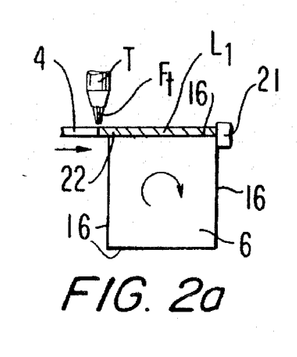
FIGS. 2a–2e show schematic cross sections of successive stages in the manufacture of a square-section product using the process according to the present invention.
Figure 2B:
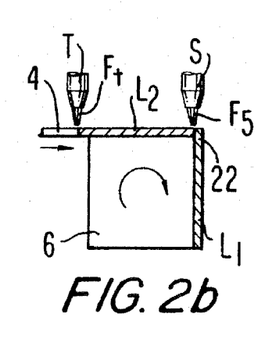
Figure 2C:
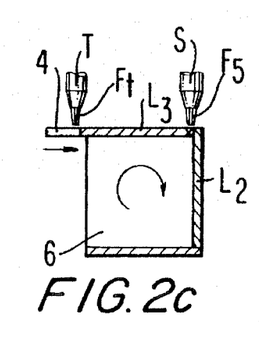
Figure 2D:
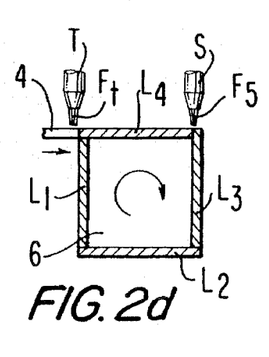
Figure 2E:
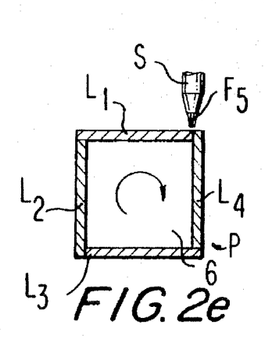

Open section irons may be produced by omitting one or more faces of a corresponding polygonal section. For example, the FIG. 2–3 process may be applied for producing channel sections by omitting the last two stages (FIGS. 2d, 2e).

Figure 9:
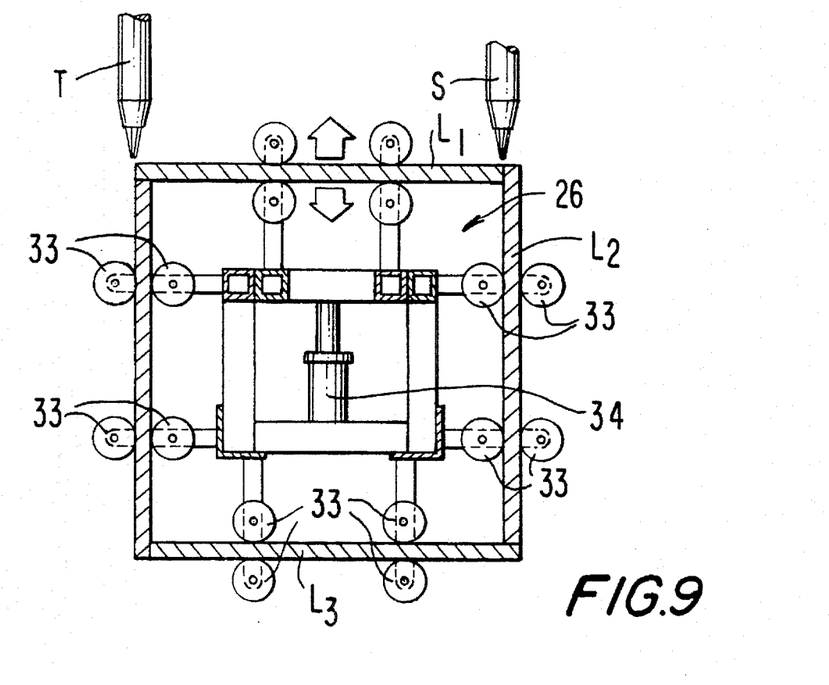
FIG. 9 shows a schematic cross section of a variation of a detail in FIG. 1.

The work holders may be of any design, providing they are such as to define supporting surfaces, even ideal or discontinuous, for the sheet. For example, the supporting surfaces may be defined ideally by a number of pairs of rollers 33 between which the sheet is fed, as shown schematically in the FIG. 9 variation. The work holders may also be adjustable, i.e. comprising one or more supporting surfaces movable by means of actuators, for producing parts of different shapes. One example of this is shown in FIG. 9, wherein one of the supporting surfaces is movable perpendicularly to itself by means of an actuator 34, for producing square or rectangular box sections.

Figure 10A:
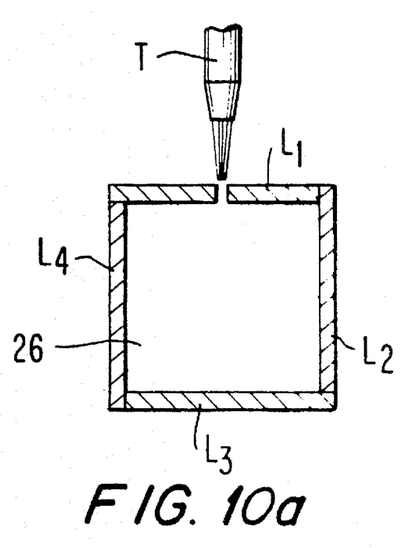
FIG. 10 shows a schematic cross section of successive stages in the FIG. 2 process, for manufacturing channel sections.
Figure 10B:
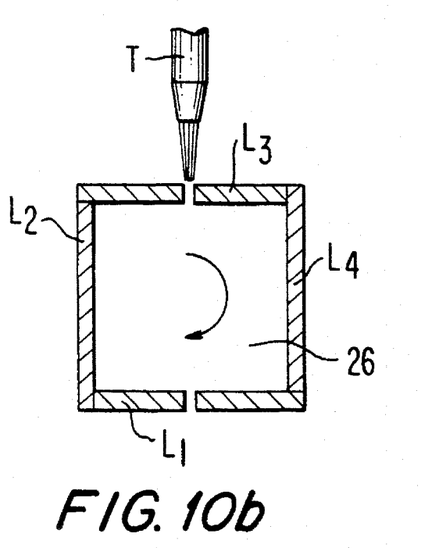

Finally, a finished box section may be cut further into portions of a given shape, as shown in FIG. 10, wherein a square box section is cut into two channels by cutting two of the sheets (e.g. L1, L3) along the center line. This is conveniently done by the same laser head T used for cutting off sheets L1, ... , L4, and by rotating work holder 26 through 180° for switching from the first to the second cutting position. Instead of truncated-pyramid-shaped parts, the FIG. 5–8 process may also be applied for manufacturing pyramid-shaped parts by simply using pyramid-shaped work holders.

In the following claims, the term "pyramid-shaped" is intended to include both normal and truncated pyramids.

I claim:

1. A process for manufacturing structural sheet metal products (P), characterized by the fact that it comprises at least the following stages, consisting in:

a) feeding a continuous strip of sheet metal (4) onto a supporting surface (16) of a work holder (6; 26, 27) defining at least two supporting surfaces (16) forming, a common edge and successively positioned coincident with the plane ($\alpha$) along which said sheet metal strip (4) is fed;

b) clamping said strip (4) on to said supporting surface (16);

c) cutting a first sheet (L1) off said strip (4);

d) resetting said work holder (6; 26, 27) so as to position a further supporting surface (16) coincident with said plane ($\alpha$);

e) feeding said strip (4) on to said further supporting surface (16) of said work holder (6; 26, 27);

f) clamping said strip (4) on to said further supporting surface (16);

g) cutting a further sheet (L2) off said strip (4);

h) welding said sheets (L1, L2, ...) substantially along said common edge of said supporting surfaces (16).

2. A process as claimed in claim 1 for manufacturing box sections, wherein said work holder (6; 26, 27) presents a number of supporting surfaces (16) defining a closed polygonal cross section; characterized by the fact that said stages d) to h) are repeated cyclically until a respective sheet (L1, ..., L4) is placed on each said supporting surface (16) and welded to the previous said sheet; and by the fact that it comprises a final stage consisting in welding the last said sheet (L4) to the first (L1).

3. A process as claimed in claim 2, characterized by the fact that said stage wherein said work holder (6; 26, 27) is reset consists in rotating said work holder (6; 26, 27) by a predetermined amount about its axis (B; B1, B2).

4. A process as claimed in claim 3, characterized by the fact that said stage wherein said work holder (6) is reset also consists in moving said work holder (6) perpendicularly to said plane ($\alpha$).

5. A process as claimed in claim 1 for manufacturing tapered products; characterized by the fact that each said cutting stage consists in cutting two oppositely-tapered sheets (L1, L'1; ...; L4, L'4) off said strip (4); each said sheet being fed on to a respective work holder (26, 27).

6. A process as claimed in claim 1, characterized by the fact that said cutting stages are performed by at least one laser beam (Ft).

7. A process as claimed in claim 2, characterized by the fact that said welding stages are performed by at least one laser beam (Fs).

8. An apparatus (1) for manufacturing structural sheet metal products; characterized by the fact that it comprises:

means (7) for feeding a sheet metal strip (4) along a given plane ($\alpha$);

at least one work holder (6; 26, 27) having at least two supporting surfaces (16) forming, a common edge;

means (17) for so positioning said work holder as to successively position said supporting surfaces (16) coincident with said plane ($\alpha$);

means (20) for clamping said strip (4) on to each said supporting surface (16);

means (T, T1, T2) for cutting said strip (4) into sheets (L1, ..., L4) fitted to respective said supporting surfaces (16, 30, 31) of said work holder (6, 26);

means (S, S1, S2) for welding said sheets (L1, ..., L4) substantially along a common edge.

9. An apparatus as claimed in claim 8, characterized by the fact that said cutting means comprise at least one head (T, T1, T2) for focusing a laser beam (Ft).

10. An apparatus as claimed in claim 8, characterized by the fact that said welding means comprise at least one head (S, S1, S2) for focusing a laser beam (Fs).

11. An apparatus as claimed in claim 8, characterized by the fact that said positioning means comprise a device (17) for rotating said work holder (6) about an axis (B).

12. An apparatus as claimed in claim 11, characterized by the fact that said positioning means also comprise a device for moving said work holder (6) perpendicularly to said plane ($\alpha$).

13. An apparatus as claimed in claim 8, characterized by the fact that said work holder (6) presents a number of said supporting surfaces (16) defining a closed polygonal section.

14. An apparatus as claimed in claim 13, characterized by the fact that said work holder (6) presents a rectangular section.

15. An apparatus as claimed in claim 13, characterized by the fact that said work holder (6) presents a square section.

16. An apparatus as claimed in claim 13, characterized by the fact that said work holder (6) comprises means (34) for adjusting the position of at least one of said supporting surfaces (16).

17. An apparatus as claimed in claim 13, characterized by the fact that said work holder (26; 27) is pyramid-shaped.

18. An apparatus as claimed in claim 17, characterized by the fact that it comprises two oppositely-tapered, pyramid-shaped work holders (26, 27) rotating about respective axes (B1, B2) inclined in relation to each other so that a respective supporting surface of each said work holder (26, 27) is parallel to said plane ($\alpha$).

* * * * *